(12) United States Patent
Fukuhara

(10) Patent No.: US 7,924,689 B2
(45) Date of Patent: Apr. 12, 2011

(54) OPTICAL DISK APPARATUS

(75) Inventor: Takashi Fukuhara, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 249 days.

(21) Appl. No.: 12/418,865

(22) Filed: Apr. 6, 2009

(65) Prior Publication Data

US 2009/0262624 A1 Oct. 22, 2009

(30) Foreign Application Priority Data

Apr. 22, 2008 (JP) ................................ 2008-111517
Mar. 3, 2009 (JP) ................................ 2009-049459

(51) Int. Cl.
*G11B 7/00* (2006.01)

(52) U.S. Cl. ..... 369/116; 369/59.1; 369/53.2; 369/47.5; 369/47.19

(58) Field of Classification Search ......................... None
See application file for complete search history.

(56) References Cited

U.S. PATENT DOCUMENTS

| | | | | |
|---|---|---|---|---|
| 6,061,318 | A * | 5/2000 | Hwang | 369/53.23 |
| 7,173,898 | B2 * | 2/2007 | Nishi et al. | 369/116 |
| 7,400,567 | B2 | 7/2008 | Nishikawa et al. | 369/103 |
| 7,715,285 | B2 * | 5/2010 | Maegawa | 369/44.13 |
| 2006/0239139 | A1 | 10/2006 | Kataoka et al. | 369/44.23 |
| 2007/0008853 | A1 | 1/2007 | Nakao et al. | 369/53.22 |
| 2007/0280065 | A1 | 12/2007 | Fukuhara | 369/44.29 |
| 2008/0089203 | A1 | 4/2008 | Nishimura et al. | 369/53.23 |
| 2009/0003185 | A1 | 1/2009 | Shou et al. | 369/121 |

FOREIGN PATENT DOCUMENTS

| | | |
|---|---|---|
| JP | 10-228645 A | 8/1998 |
| JP | 2006-209812 | 8/2006 |
| JP | 2007-134003 | 5/2007 |
| JP | 2008-71445 A | 3/2008 |
| JP | 2008-084504 A | 4/2008 |
| KR | 10-2008-0029865 A | 4/2008 |
| WO | WO 2007/034783 A1 | 3/2007 |

OTHER PUBLICATIONS

Korean Office Action dated Aug. 20, 2010, issued in counterpart Korean patent application No. 10-2009-003442.
European Search Report dated Jun. 29, 2009, mailed in a Communication dated Jul. 8, 2009 in copending European patent application No. EP 09 15 7476.

* cited by examiner

*Primary Examiner* — Muhammad N Edun
(74) *Attorney, Agent, or Firm* — Fitzpatrick, Cella, Harper & Scinto

(57) ABSTRACT

Provided is an optical disk apparatus which optimizes a frequency of a high frequency superimposing operation upon reproduction so that good reproduction performance is realized in a wide irradiation power range of a laser power. The optical disk apparatus includes: a semiconductor laser device; an optical disk discrimination circuit for performing laser discrimination; a driver device including a drive circuit for supplying direct drive current to the semiconductor laser device and a high frequency superimposing circuit for superimposing high frequency current on the drive current; and a high frequency superimposing variable circuit for changing a frequency of the high frequency current in which when information is reproduced, the high frequency superimposing variable circuit sets the frequency of the high frequency current for reproducing a multi-layer disk to be higher than the frequency of the high frequency current for reproducing a single-layer disk.

3 Claims, 5 Drawing Sheets

OPTICAL DISK APPARATUS

BACKGROUND OF THE INVENTION

1. Field of the Invention

The present invention relates to an optical disk apparatus that can optimize frequency of high frequency current to be superimposed so as to realize good reproduction performance within a wide irradiation power range necessary for reproducing a single-layer disk and a multi-layer disk.

2. Description of the Related Art

As a method for reducing noise of the semiconductor laser in a reproduction process, a high frequency superimposing method is known. In this method, high frequency alternating current (high frequency current) output from a high frequency superimposing circuit is superimposed on direct current output from a semiconductor laser device drive circuit, thereby being supplied to the semiconductor laser for pulse oscillation. Thus, interference between a light flux emitted from the semiconductor laser and a light flux returning to the semiconductor laser via an optical system of the optical disk apparatus is reduced so that occurrence of the laser noise can be suppressed.

Here, Japanese Patent Application Laid-Open No. 2007-134003 discloses a technology in which an information recording surface of an optical disk is divided into multiple concentric regions, and the irradiation power is changed in accordance with each of the regions in the reproduction process to thereby switch, in accordance with the changed irradiation power, output amplitude or frequency of the high frequency current.

However, the above-mentioned conventional technology does not specifically disclose optimizing of the frequency of the high frequency current to be superimposed in accordance with the irradiation power of the semiconductor laser.

Here, the inventor of the present invention found that the following problems arise if the high frequency superimposing method is to be performed with a wide range of the irradiation power that is necessary for reproducing a single-layer disk and a multi-layer disk compared with the case where a predetermined recording layer is reproduced as in the above-mentioned conventional technology.

For instance, it is supposed that a frequency of high frequency current optimized in a high irradiation power range that is necessary for a multi-layer disk is superimposed in a low irradiation power range that is necessary for a single-layer disk. In this case, intrinsic noise of the semiconductor laser increases in the low irradiation power range so that the reproduction performance is deteriorated.

On the contrary, it is supposed that a frequency of high frequency current optimized in a low irradiation power range that is necessary for a single-layer disk is superimposed in a high irradiation power range that is necessary for a multi-layer disk. In this case, influence of the return light increases in the high irradiation power range so that the reproduction performance is deteriorated.

As described above, it is difficult to satisfy good reproduction performance in both ranges including the high irradiation power range necessary for the multi-layer disk and the low irradiation power range necessary for the single-layer disk.

SUMMARY OF THE INVENTION

The present invention has been made to solve the above-mentioned problems, and it is therefore an object of the present invention to provide an optical disk apparatus that can optimize frequency of high frequency current to be superimposed so as to realize good reproduction performance within a wide irradiation power range necessary for reproducing a single-layer disk and a multi-layer disk.

In order to solve the above-mentioned problems, the present invention provides an optical disk apparatus including: a semiconductor laser device for emitting a laser beam for reproducing information recorded on an optical disk having one of multiple recording layers and a single recording layer; an optical disk discrimination circuit for discriminating whether the optical disk has the one of the multiple recording layers and the single recording layer; a driver device including a drive circuit for supplying direct current to the semiconductor laser device and a high frequency superimposing circuit for superimposing high frequency current on the direct current; and a high frequency superimposing variable circuit for changing a frequency of the high frequency current. The frequency for reproducing the optical disk having the multiple recording layers is higher than the frequency for reproducing the optical disk having the single recording layer.

Further features of the present invention will become apparent from the following description of exemplary embodiments with reference to the attached drawings.

DESCRIPTION OF THE EMBODIMENTS

Now, a structure of the present invention is described below. Here, the structure described below should not be interpreted in a limiting manner, and it can be modified within the spirit of the present invention.

First, an optical disk apparatus of the present invention includes a semiconductor laser device for emitting a laser beam and an optical disk discrimination circuit for discriminating whether an optical disk has multiple recording layers or a single recording layer. In addition, the optical disk apparatus includes a driver device having a semiconductor laser device drive circuit for supplying direct current to the semiconductor laser device and a high frequency superimposing circuit for superimposing high frequency current on the direct current, and a high frequency superimposing variable circuit for changing a frequency of the high frequency current. Further, the optical disk apparatus includes a discrimination circuit for discriminating whether the recording layer of the optical disk consists of a single layer or multiple layers. Further, a frequency of the high frequency current when an optical disk having multiple recording layers is reproduced is set to be higher than a frequency of the high frequency current when an optical disk having a single recording layer is reproduced. Thus, a frequency of the high frequency current to be superimposed can be optimized within a wide irradiation power range necessary for reproducing a single-layer disk and a multi-layer disk, so as to provide an optical disk apparatus that can realize good reproduction performance.

In addition, the optical disk apparatus further includes a photodetector for detecting irradiation power of the laser beam. Here, the optical disk discrimination circuit discriminates whether the optical disk has a single layer or multiple layers to thereby adjust the irradiation power based on a result of the discrimination. Then, the high frequency superimposing variable circuit adjusts the frequency of the high frequency current based on the adjusted irradiation power. Thus, the superimposed frequency can be adjusted appropriately according to the irradiation power.

In addition, the optical disk apparatus adjusts the irradiation power of the laser beam based on the result of the discrimination performed by the optical disk discrimination circuit and switches the frequency of the high frequency current to be superimposed by the high frequency superimposing variable circuit. In this case, there is no need to learn the irradiation power in advance, but the irradiation power and the superimposed frequency are switched according to the preset type of the optical disk, such as a single layer or multiple layers. Hence, rapid adjustment can be performed.

Example 1

Example 1 of the present invention is described with reference to FIGS. 1 to 3.

Figure 1:
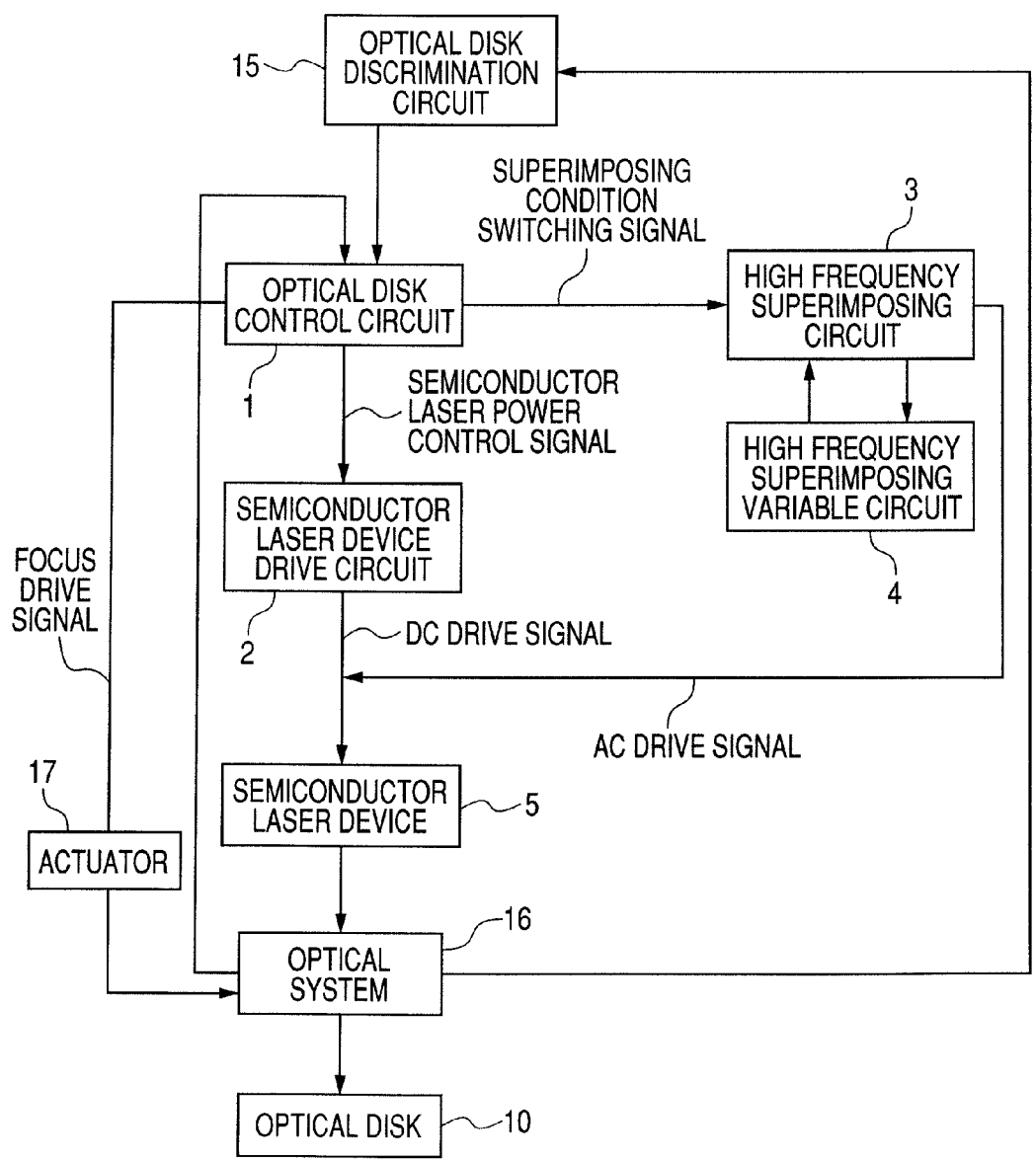
FIG. 1 is a diagram illustrating a structure of an optical disk apparatus according to Example 1.

FIG. 1 is a block diagram of a structure of the optical disk apparatus. An optical disk control circuit 1 has a function as a CPU for controlling a drive mode such as a recording mode or a reproducing mode, for controlling irradiation power of a semiconductor laser device 5 in each drive mode, and for controlling a high frequency superimposing condition. Further, the optical disk control circuit 1 sets the irradiation power of the semiconductor laser device 5 based on a detection signal of a photodetector 6 (power monitor), which is described later with reference to FIG. 2, for receiving a light flux emitted from the semiconductor laser device 5.

Note that the photodetector 6 constitutes a part of an optical system 16. Further, a semiconductor laser device drive circuit 2 supplies direct current (hereinafter referred to as a DC drive signal simply) to the semiconductor laser device 5 based on a semiconductor laser power control signal output from the optical disk control circuit 1.

In addition, a high frequency superimposing circuit 3 includes a high frequency superimposing variable circuit 4 for adjusting a superimposed frequency based on a superimposing condition switching signal output from the optical disk control circuit 1, and hence the laser beam is emitted at a desired superimposed frequency. In general, a laser diode driver (driver device) is used, which has both functions of the semiconductor laser device drive circuit 2 and the high frequency superimposing circuit 3. Further, the high frequency superimposing variable circuit 4 is disposed externally with respect to the laser diode driver. The adjustment of the superimposed frequency based on the superimposing condition switching signal is described later. Further, the high frequency current output from the high frequency superimposing circuit 3 (hereinafter referred to as an AC drive signal simply) is superimposed on the DC drive signal, which is supplied to the semiconductor laser device 5. Therefore, the semiconductor laser device 5 oscillates at the desired superimposed frequency based on the DC drive signal and the AC drive signal.

Further, an optical disk discrimination circuit 15 discriminates in advance whether the optical disk has a single recording layer or multiple recording layers. Here, description is made of the optical disk discrimination circuit 15 with reference to FIGS. 1 and 2. A focus drive signal is supplied from the optical disk control circuit 1 to an actuator 17 carrying an objective lens 9 of the optical system 16. Then, the number of recording layers is detected based on a signal detected by a light receiving device 11 along with focus drive to thereby obtain a result of discrimination as to whether an optical disk 10 is a single-layer disk or a dual-layer disk.

Note that the laser power herein means an average value of the output when the DC drive signal and the AC drive signal are supplied. In addition, the laser power can be changed by changing a level of the DC drive signal or an amplitude value of the AC drive signal.

Figure 2:
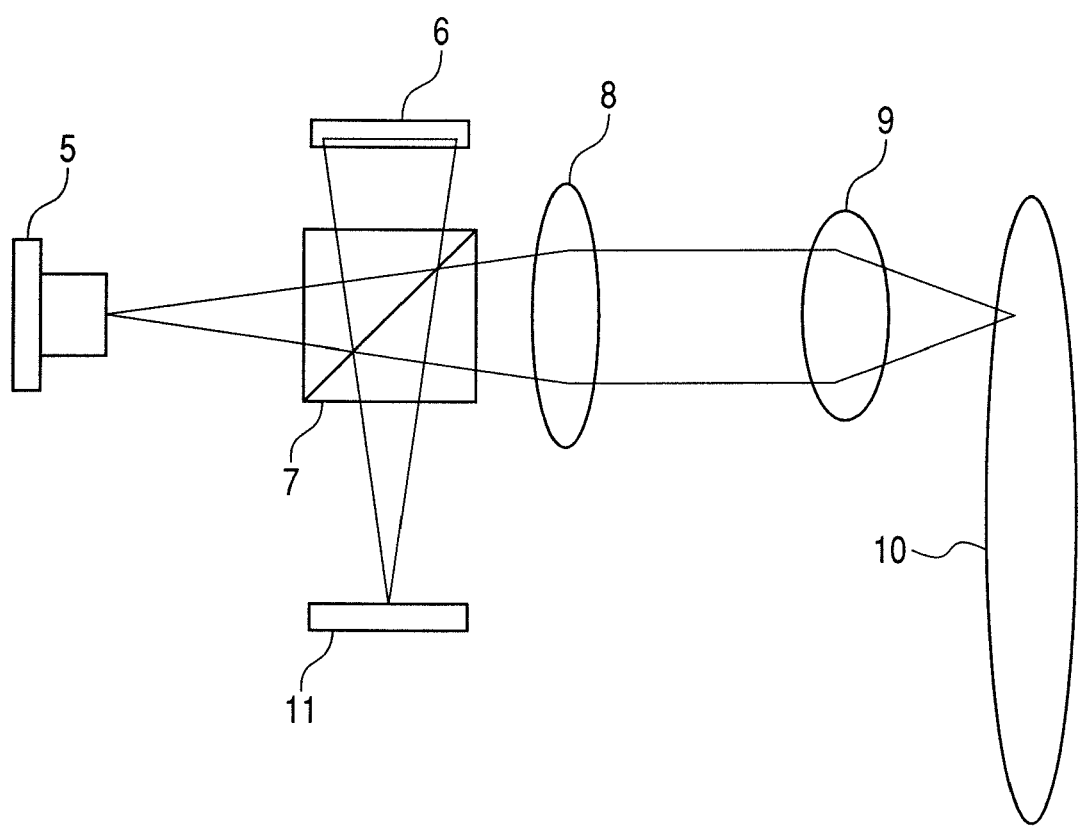
FIG. 2 is a diagram illustrating a structure of an optical system according to Example 1.

FIG. 2 is a diagram illustrating a structure of the optical system 16 in the optical disk apparatus.

The light flux emitted from the semiconductor laser device 5 passes through a beam splitter 7, and a collimator lens 8 collimates the light flux, which is then condensed by the objective lens 9 onto the optical disk 10. In addition, a part of the light flux is deflected by the beam splitter 7 and enters the photodetector 6. The light flux that is reflected by the optical disk 10 becomes a parallel light flux again after passing through the objective lens 9, becomes a converging light flux after passing through the collimator lens 8, and enters the beam splitter 7. The light flux is deflected by the beam splitter 7 and is condensed to the light receiving device 11, which detects the signal so as to reproduce information.

Here, description is made of a method of setting the irradiation power and a method of adjusting the frequency. First, the optical disk control circuit 1 discriminates whether the optical disk has a single recording layer or multiple recording layers. As described above, the focus drive signal is supplied from the optical disk control circuit 1 to the actuator 17 carrying the objective lens 9 of the optical system 16. Then, the number of recording layers is detected based on the signal detected by the light receiving device 11 along with focus drive to thereby obtain the result of discrimination as to whether the optical disk 10 is a single-layer disk or a dual-layer disk.

Subsequently, the optical disk control circuit 1 instructs the semiconductor laser device drive circuit 2 to set an optimal irradiation power based on the result of discrimination.

Subsequently, the semiconductor laser device drive circuit 2 sends a DC drive signal to the semiconductor laser device 5 to thereby adjust the irradiation power.

Further, in accordance with a change in irradiation power obtained by the photodetector 6, the superimposing condition switching signal is output to the high frequency superimposing circuit 3. Based on the superimposing condition switching signal, the high frequency superimposing circuit 3 outputs the signal for adjusting the superimposed frequency to the high frequency superimposing variable circuit 4.

A combined resistance for adjusting the superimposed frequency in the high frequency superimposing variable circuit 4 is not illustrated in the drawing, but is achieved by using a known technology. Here, based on the superimposing condition switching signal supplied to the high frequency superimposing circuit 3, a combined resistance value Radj held in the high frequency superimposing variable circuit 4 is adjusted. Thus, a frequency of the AC drive signal output from the high frequency superimposing circuit 3 can be adjusted in accordance with the combined resistance value.

Figure 3:
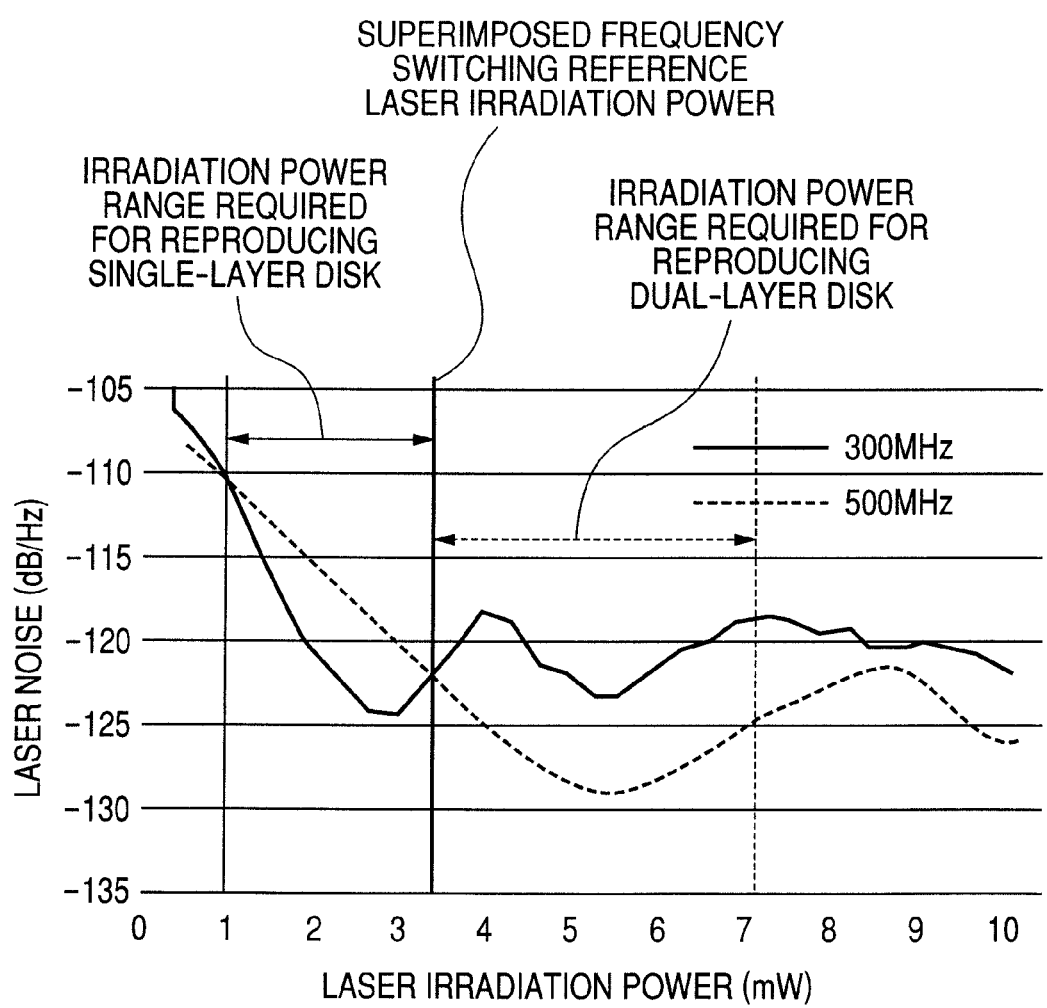
FIG. 3 is a diagram illustrating laser noise characteristics with respect to a semiconductor laser irradiation power according to Example 1.

FIG. 3 is a diagram illustrating laser noise characteristics when the superimposed frequency is switched with respect to the irradiation power of the semiconductor laser device 5. The horizontal axis represents the laser irradiation power (mW), and the vertical axis represents the laser noise (dB/Hz).

An irradiation power range of the semiconductor laser device 5 required for reproduction of the single-layer disk is approximately 1 to 3.3 mW. If the reproduction is performed in this case at the superimposed frequency of 300 MHz, good laser noise characteristics can be obtained. In addition, the irradiation power range of the semiconductor laser device 5 required for reproduction of the dual-layer disk is approximately 3.3 to 7 mW. If the reproduction is performed in this case at the superimposed frequency of 500 MHz, good laser noise characteristics can be obtained. Here, the superimposed frequency is switched at 3.3 mW as a reference irradiation power of the semiconductor laser device 5, which corresponds to an intersection of two noise characteristic curves having superimposed frequencies of 300 MHz and 500 MHz. Thus, good noise characteristics can be obtained in a wide irradiation power range required for reproduction of a single-layer disk and a dual-layer disk.

Specifically, the irradiation power of the semiconductor laser device 5 is adjusted according to a result of layer discrimination. Then, it is supposed that the optical disk control circuit 1 decides that the irradiation power of the semiconductor laser device 5 is approximately 2.8 mW based on the irradiation power detected by the photodetector 6. In this case, the optical disk control circuit 1 performs reproduction at a superimposed frequency of approximately 300 MHz by the high frequency superimposing variable circuit 4 based on the superimposing condition switching signal supplied to the high frequency superimposing circuit 3.

In addition, it is supposed that the optical disk control circuit 1 decides that the irradiation power of the semiconductor laser device 5 is approximately 5.5 mW based on the irradiation power detected by the photodetector 6. In this case, the optical disk control circuit 1 performs reproduction at a superimposed frequency of approximately 500 MHz by the high frequency superimposing variable circuit 4 based on the superimposing condition switching signal supplied to the high frequency superimposing circuit 3.

In this way, an optimal superimposed frequency can be set in accordance with the irradiation power. As described above, in Example 1, the layer of the optical disk is discriminated, the irradiation power of the semiconductor laser device is set according to the result of the layer discrimination, and the superimposed frequency is adjusted based on the change in irradiation power thus set.

Thus, even if the output power of the semiconductor laser device 5 fluctuates because of a temperature variation or other environmental variations, the superimposed frequency can be adjusted to be an optimal value according to the fluctuation.

Example 2

Example 2 of the present invention is described with reference to FIG. 4.

Example 2 is different from Example 1 in that the irradiation power and the superimposed frequency are set separately based on a result of the discrimination performed by an optical disk discrimination circuit 15.

Figure 4:
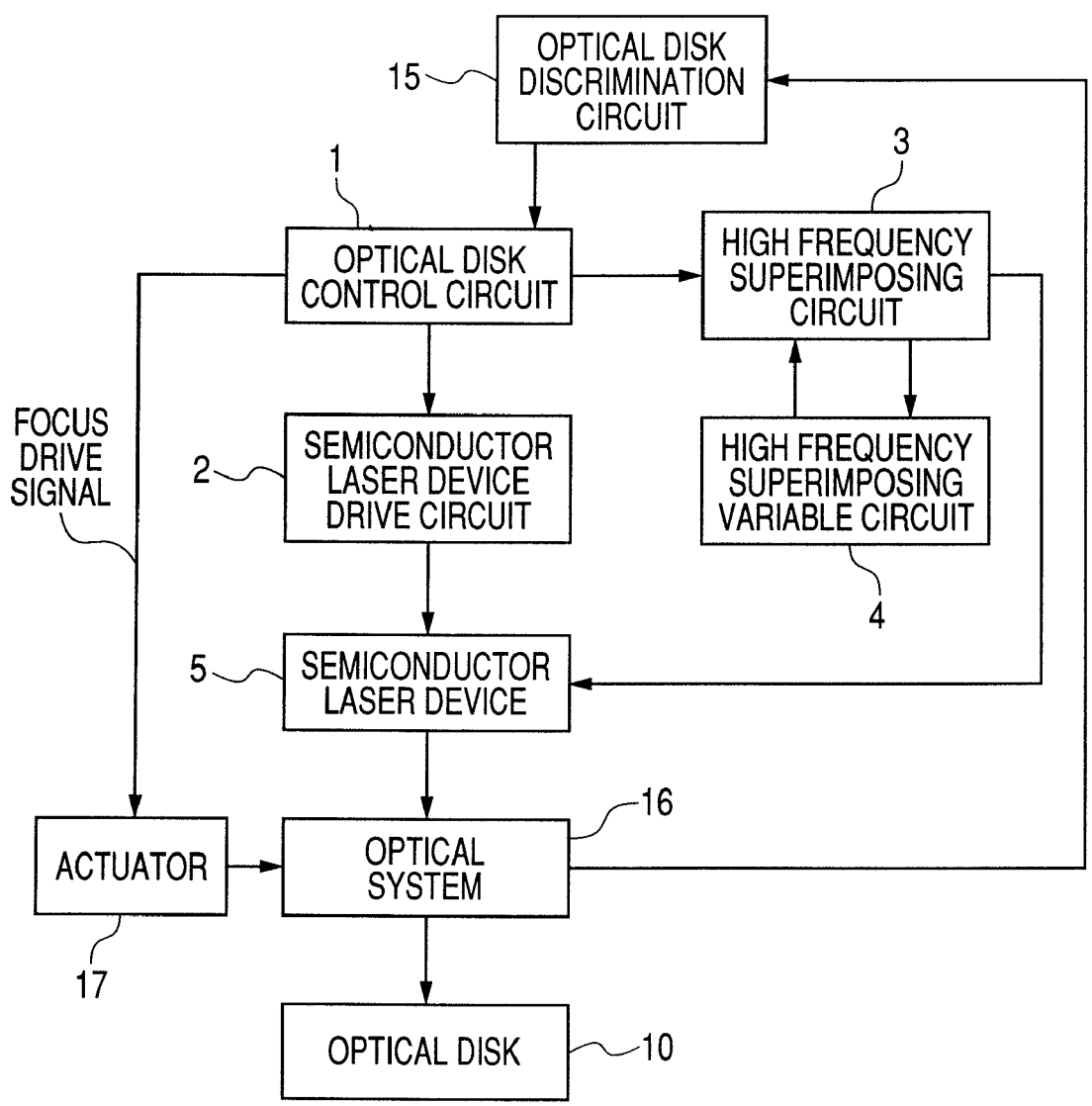
FIG. 4 is a diagram illustrating a structure of an optical disk apparatus according to Example 2.

FIG. 4 is a block diagram illustrating a structure of an optical disk apparatus. An optical disk control circuit 1 sets the irradiation power of a semiconductor laser device 5. The irradiation power of a semiconductor laser device 5 is set based on a discrimination signal for discriminating whether the optical disk has a single recording layer or multiple recording layers, which is supplied from the optical disk discrimination circuit 15. The optimal irradiation power is different depending on whether an optical disk 10 has a single recording layer or two recording layers. Therefore, the optimal irradiation power is determined for each optical disk 10 in advance. At the same time, the superimposed frequency appropriate to each of the single-layer optical disk and the dual-layer optical disk is also determined. Data of the irradiation power and superimposed frequency determined in advance is stored in a memory or the like (not shown).

As described above, unlike Example 1, the optimal superimposed frequency can be set without detecting the irradiation power of the laser when the reproduction operation is performed. Note that an optical system 16 of the optical disk apparatus has the same structure as that described above with reference to FIG. 2.

Further, the optical disk discrimination circuit 15 is the same as in Example 1, and therefore description thereof is omitted.

Here, detailed description is made of the setting of the irradiation power and the superimposed frequency. If the optical disk discrimination circuit 15 decides that the optical disk to be reproduced is a single-layer disk, the irradiation power of the semiconductor laser device 5 is set to be 2 mW while the superimposed frequency is set to be 300 MHz. On the other hand, if the optical disk to be reproduced is decided to be a dual-layer disk, the irradiation power of the semiconductor laser device 5 is set to be 5 mW while the superimposed frequency is set to be 500 MHz.

Figure 5:
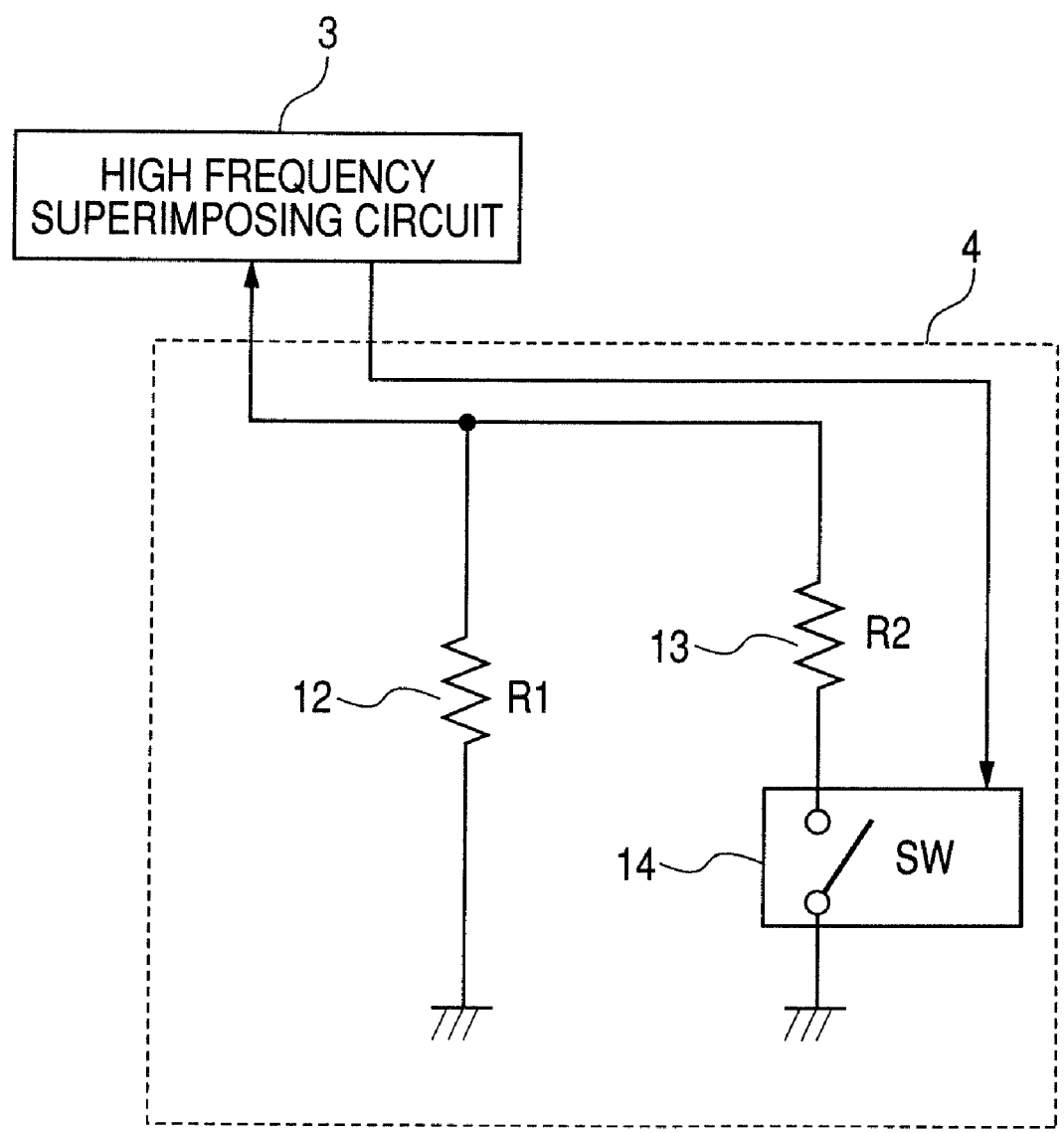
FIG. 5 is a diagram illustrating a structure of a superimposing condition variable circuit according to Example 2.

In particular, the superimposed frequency is set as follows. That is, after the optical disk discrimination circuit 15 discriminates the optical disk 10, information of the irradiation power that is optimal to the optical disk 10 is supplied as the superimposing condition switching signal to a high frequency superimposing circuit 3. Based on the superimposing condition switching signal, a combined resistance value Radj of a high frequency superimposing variable circuit 4 is determined, and hence the current supplied to the high frequency superimposing circuit 3 is changed. Specifically, as illustrated in FIG. 5, a switch 14 (hereinafter, the "switch" is abbreviated as "SW") is provided for switching serial/parallel connection of a resistor. When the SW 14 is turned off, the combined resistance value Radj is switched to be R1. Thus, the current value supplied to the high frequency superimposing circuit 3 is changed, thereby enabling outputting of an AC drive signal of an optimal frequency according to the irradiation power of the semiconductor laser device 5.

On the other hand, when the SW 14 is turned on, resistors R1 and R2 are connected in parallel to each other, and the combined resistance value Radj becomes R1·R2/(R1+R2). Thus, the current supplied to the high frequency superimposing circuit 3 is changed, thereby enabling outputting of an AC drive signal of an optimal frequency according to the irradiation power of the semiconductor laser device 5.

Thus, the high frequency superimposing circuit 3 outputs the AC drive signal having the optimal superimposed frequency. In addition, the semiconductor laser power control signal is supplied to a semiconductor laser device drive circuit 2, and hence the DC drive signal is output based on the semiconductor laser power control signal. The AC drive signal having the optimal superimposed frequency is superimposed on the DC drive signal. Thus, even if the necessary irradiation power is different depending on a type of the optical disk 10, the reproduction operation can be performed at the optimal superimposed frequency.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2008-111517, filed Apr. 22, 2008, and No.

2009-049459, filed Mar. 3, 2009, which are hereby incorporated by reference herein in their entirety.

What is claimed is:

1. An optical disk apparatus, comprising:
a semiconductor laser device for emitting a laser beam for at least one of recording and reproducing information on an optical disk having one of multiple recording layers and a single recording layer;
an optical disk discrimination circuit for discriminating whether the optical disk has the one of the multiple recording layers and the single recording layer;
a driver device comprising:
   a drive circuit for supplying direct current to the semiconductor laser device; and
   a high frequency superimposing circuit for superimposing high frequency current on the direct current; and
a high frequency superimposing variable circuit for changing a frequency of the high frequency current,
wherein the high frequency superimposing variable circuit sets the frequency for reproducing the optical disk having the multiple recording layers to be higher than the frequency for reproducing the optical disk having the single recording layer.

2. The optical disk apparatus according to claim 1, further comprising a photodetector for detecting an irradiation power of the laser beam, wherein:
the irradiation power of the semiconductor laser device is adjusted based on a result of discrimination performed by the optical disk discrimination circuit; and
the high frequency superimposing variable circuit adjusts the frequency of the high frequency current based on the irradiation power detected by the photodetector.

3. The optical disk apparatus according to claim 1, wherein:
the drive circuit adjusts the irradiation power of the laser beam based on the result of the discrimination performed by the optical disk discrimination circuit; and
the high frequency superimposing variable circuit switches the frequency of the high frequency current based on the result of the discrimination.

* * * * *